May 30, 1967 G. K. WEBER ETAL 3,322,585
METHOD OF MAKING A CONDENSED FILAMENTOUS MAT
Filed Feb. 27, 1963
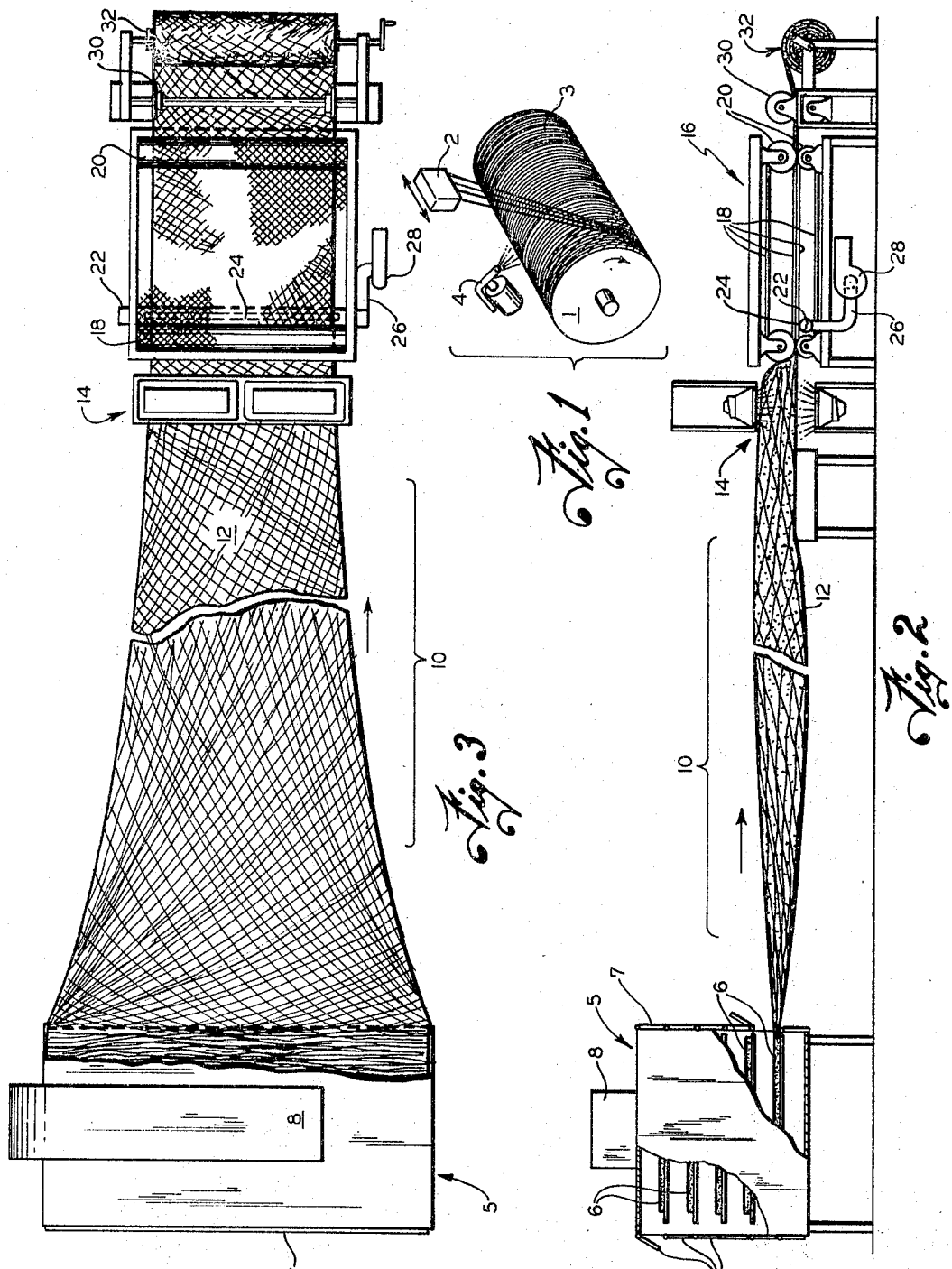
INVENTORS.
GEORGE K. WEBER
JOHN E. COPENHEFER
BY
Edward C. Arenz
ATTORNEY

United States Patent Office 3,322,585
Patented May 30, 1967

3,322,585
METHOD OF MAKING A CONDENSED
FILAMENTOUS MAT
George K. Weber, Louisville, and John E. Copenhefer, Anchorage, Ky., assignors to American Air Filter Company, Inc., Louisville, Ky., a corporation of Delaware
Filed Feb. 27, 1963, Ser. No. 261,386
9 Claims. (Cl. 156—174)

This invention relates to a method for making a filamentous product of a character useful as a reinforcing and/or decorative element in molded plastic articles.

One particular type of filamentous mat to which the invention is applicable has been conventionally made in the following manner. Filaments drawn from a molten glass supply are wound on a rotating drum in a back and forth helical pattern to build up a compact cylindrical mat comprising a series of overlying layers, with at least a part of the filaments of adjacent layers lying in crossing relation to each other. The compact cylindrical mat is cut along an axially extending line and is removed from the drum to form a planar compact mat which is then stretched in a direction transverse to the general lay of the filaments. During this stretching operation the filaments of the mat are reoriented in a manner which causes the mat to be elongated to many times its original length, to be narrowed in width, and to be puffed or expanded in thickness. The mat of thusly changed structural character is then directed in a flattened condition onto an endless conveyor which carries it through a dip tank containing a water emulsion or solution of binder material, then over a suction slot to remove excess binder and finally through a rather long heating oven which drives off the water and leaves the binder on the mat. Frequently the dip tank formulation includes a finish component to improve the bond between the glass filaments and the binder material.

To carry out that process large, expensive ovens for heating the mat are required. For example, the ovens are in the order of 80–90 feet long and contain substantial equipment to insure proper air and heat distribution within the oven. In addition to the rather extensive production facilities required for such a process, the resultant product is sometimes lacking in uniformity of filament distribution because of clumping of the uncoated filaments during the stretching step. This difficulty is particularly experienced with those compact mats having a high concentration of filaments wound in collected form.

One object of this invention is to provide an improved method for making a filamentous product which does not require the use of the large, expensive ovens. Additional objects will appear from the following.

In accordance with the invention, a heat softenable synthetic resin binder material containing a small percentage of a silane finish component is applied to the filaments as the mat is being formed on the drum. Before stretching the compact mat (which has been removed from the drum and disposed in planar form), the mat is heated to soften the resin. At the beginning of the stretching operation, the softened resin permits the filaments to be reoriented to form the expanded pad, but at the same time prevents shifting of the filaments in a manner which would result in a non-uniform pad. By the time the stretching is completed, the pad has cooled sufficiently that the resin has hardened somewhat. Then the pad is momentarily subjected to high heat to soften the resin, without curing it, and is then immediately compressed and maintained in a compressed condition while it cools on its way to a packaging station where it is wound up.

The invention will be described in connection with the accompanying drawing wherein:

FIGURE 1 is a diagrammatic view showing one example of apparatus for winding filaments to make a cylindrical compact mat;

FIGURE 2 is a partly broken diagrammatic elevational view of apparatus for processing a mat after its removal from the drum; and FIGURE 3 is a partly broken diagrammatic top view of the apparatus of FIGURE 2.

One form of apparatus for forming the compact cylindrical mat is diagrammatically illustrated in FIG. 1. Essentially, it includes a rotating drum 1 upon which filaments from one or more glass furnaces or feeders 2 are wound back and forth in helical patterns to build up the compact cylindrical mat 3. The mat is made up of a series of overlying layers of filaments, with at least some of the filaments of each layer lying in crossing relation to filaments in adjacent layers. Winding filaments in this general way to form cylindrical compact mats which are then removed from the drum and stretched is well known. Examples of patents which describe winding practices of this general character include Jackson U.S. Patents 2,798,531 and 3,036,946.

While the mat is being formed on the drum, a liquid binder containing a finish component material is applied to the glass filaments from spray apparatus 4 arranged to periodically traverse the drum surface.

Polyester resins containing a very small amount of a silane finish are presently preferred as the binder system. Best results to date have been obtained with a formulation of: about 84% Laminac 4123 (a styrene modified polyester, for example, a resin produced by the condensation polymerization of saturated and unsaturated dibasic acids with polyfunctional alcohol where the resulting ester has been cross-linked with a monomer, for example, styrene), manufactured by American Cyanamid Company; about 16% of a selected second polyester composition (which can be an alkyd such as a polyester reaction product of a polyhydric alcohol and carboxylic acid or an anhydride of the acid in a solution of a fine monomer) such as InterChem 1390 manufactured by Interchemical Corp.; and between 0.5% and 1% of Dow Corning Z6030 (gamma - methacryloxpopropyltrimethoxysilane) as the finish component.

Other examples of formulations which provide satisfactory results follow, with the components of the formulations specified by weight.

*Example 2*

| | Percent |
|---|---|
| American Cyanamid Laminac 4123 | About 99.25 |
| Dow Corning Z6030 | About 0.75 |

*Example 3*

| | |
|---|---|
| American Cyanamid Laminac 4116 (similar to Laminac 4123 but different concentrations) | About 99.5 |
| Dow Corning Z6030 | About 0.5 |

*Example 4*

| | |
|---|---|
| American Cyanamid Laminac 4204 (similar to Laminac 4123, but different in composition) | About 60 |
| 50/50 mix of high flash naphtha and toluene | About 39 |
| Dow Corning Z6030 | About 0.75 |
| Benzoyl peroxide | About 0.60 |

The completed cylindrical compact mat 3 containing the binder-finish composition is removed from the drum 1 by slitting the mat along a line parallel to the axis of the drum and then unwrapping the mat from the drum. The planar compact mat is then transferred to the apparatus of FIGS. 2 and 3 for further processing.

As shown in these FIGS. 2 and 3, an oven 5 is provided to store and heat the planar compact mats 6 before stretching. Horizontal shelves in the oven support openwork frames upon which the mats rest before stretching. Doors 7 are provided on both sides of the oven so that the mats may be inserted from one side and stretched and expanded out of the other side. Heat for the oven may be provided by a gas fired furnace 8 which circulates heated air through the oven.

The mats 6 are disposed within the oven with the filaments extending generally lengthwise of the oven and transverse to the direction in which the mats will be stretched. The mat is stretched by grasping the filaments forming the leading (right) edge of the mat and pulling them to the right as indicated by the directional arrows in the drawing. Due to the angular relationship between filaments of adjacent layers, additional filaments successively to the left across the width of the compact mat are successively pulled out of the oven. The open stretching and expanding area is the open space designated 10 to the right of the oven.

As the compact mat is being stretched through the area 10 the filaments reorient themselves to form the expanded thickness, narrowed width, elongated pad designated 12 which has a substantially different structural character from the compact mat 6. The filament shift in the general fashion of a lazy tongs movement with many of the filaments assuming a diagonal disposition of greater or lesser degree in the expanded pad. Some of these filaments assume positions more directly across the mat than other filaments and consequently these more directly crossing filaments become corrugated or wavy or swirled so as to fit within end points spaced apart considerably less than their straight line length.

Successive increments of the stretched and expanded pad then pass momentarily through a relatively high heat space 14 immediately before entering a compression unit 16. One suitable source of heat is infra-red heating units positioned both above and below the travel path of the pad.

The compression unit comprises upper and lower endless woven wire belts 18, driven by rolls 20, which are spaced apart to receive the flattened mat therebetween. Immediately adjacent the left compression rolls 20 into which the expanded thickness pad first enters is a tubular member 22 having an upper longitudinal slot 24. The member 22 is disposed between the upper and lower flights of the lower conveyor and is connected by duct means 26 to an air blower 28. This blower draws ambient air through the flattened mat to accelerate cooling of the mat and the solidification of the binder. At the exit of the compression unit 16 an edge slitter 30 and wind-up assembly 32 are successively provided to trim the longitudinal edges of the compressed mat and wind it on a mandrel.

In the case of the polyester resin binders given as examples, the oven 5 is maintained at a temperature in the range of 150–190° F. The temperature is critical only in the sense that it should be sufficiently high to adequately soften the binder for pulling, but should not be so high as to cause either curing or discoloration of the binder. The mats may be left in the oven for an indefinite time before pulling so long as the resinous material does not contain a catalyst or hardener activated by heat.

As mentioned before, the pulling or stretching of the mat through area 10 causes it to greatly expand and open up. Consequently, air circulation through the expanded pad is enhanced and this permits the binder to cool sufficiently that it is substantially dry to the touch or untacky before entering the heating area 14 preceding the compression unit.

The momentary high heat (about 300° F.) in heating zone 14 softens the binder in pad 12 sufficiently that it again becomes tacky to the touch. Thus when the pad is compressed to a substantially decreased thickness by the front compression rolls 20, the softened binder tends to hold the filaments together while the pad is maintained in this decreased thickness condition during its passage between the upper and lower endless belt conveyors 18. The ambient air passing through the compressed pad and into the suction slot 24 hastens cooling of the pad and binder so that by the time the pad reaches the windup assembly 32 the binder has cooled sufficiently that it is no longer tacky or soft to a degree that the pad would open up if released from compression at ambient temperatures. The pad thus wound up in convolute form by the wind-up assembly 32 may be subsequently unwound without adjacent convolutions sticking together to a degree that destroys the integrity of the pad.

The particular resin selected to serve as the binder is determined in part by the molding resin with which the pad is to ultimately be used. All of the binder examples set forth work satisfactorily with a polyester molding resin, and Examples 2 and 3 also work well with an acrylic molding resin. In all cases, it is noted that curing or polymerization to any significant degree of the binder is intentionally avoided during the process.

By applying the binder-finish formulation in a single step during winding of the filaments, rather than first applying a finish and then later running the pad through a binder bath, substantial manufacturing economies are afforded through decreased space, equipment and handling requirements. The unusually small quantity of the silane finish (an expensive component) also lowers the cost of manufacture.

The deliberate avoidance of curing the binder during the described process eliminates the need for expensive ovens which take up considerable floor space, and also avoids the difficulties usually experienced in attempting to obtain a uniform cure.

The invention claimed is:
1. The method of making a filamentous product, comprising:
    (a) winding filaments back and forth upon a rotating drum to form a cylindrical mat;
    (b) applying a polyester resin-silane finish composition to said cylindrical mat as it is being formed;
    (c) severing said cylindrical mat axially and removing it from said drum to form a planar mat of compact character;
    (d) heating said planar mat to a temperature below the curing temperature of said composition to soften said composition and then stretching said mat in a diameter generally transverse to the lay of said filaments to form an expanded thickness, elongated pad;
    (e) heating said expanded thickness, elongated pad momentarily to a temperature below the curing temperature of said composition to resoften said composition;
    (f) then compressing said pad; and
    (g) cooling said pad to harden said composition while maintaining said pad in said compressed condition.
2. In the method of making a filamentous product of the type in which a compact, multi-layer drum wound mat containing crossing filaments is removed from the drum as a planar mat and stretched transversely to the lay of the filaments to form an elongated, expanded thickness pad:
    (a) applying a polyester resin-silane finish composition to said mat as it is being formed on said drum, with the silane finish component comprising less than 1% of said composition;
    (b) softening said composition with heat before stretching said mat;
    (c) momentarily reheating said composition to a temperature below the curing temperature of said composition after stretching said planar mat and,
    (d) then compressing the elongated, expanded thickness pad and maintaining it in the compressed conditions until said compressed pad cools to ambient temperature.

3. A method of making a filamentous mat, comprising:
(a) winding filaments upon a rotating drum to build up a cylindrical mat comprising a plurality of overlying layers of filaments with the filaments of at least parts of the layers lying in crossing relation to the filaments of at least parts of the adjacent layers;
(b) applying a binder-silane finish composition, in which said finish comprises less than 1% of said composition, to said filaments during winding;
(c) axially slitting, and removing from said drum, said cylindrical mat to form a planar compact mat;
(d) uniformly heating said planar mat to maintain said composition in a softened state;
(e) stretching said planar mat in a direction generally transverse to the lay of said filaments to reorient said filaments and form an expanded thickness, elongated pad;
(f) subjecting said pad momentarily to a temperature below the curing temperature of said composition to soften said composition; and
(g) then compressing said pad to a decreased thickness and maintaining said compression while said pad cools.

4. A method of making a filamentous mat, comprising:
(a) forming a compact mat of overlying layers of filaments, with at least some of the filaments of adjacent layers lying in generally crossing relation;
(b) applying a polyester resin-silane finish composition having a silane component of less than 1% to said filaments during formation of said mat;
(c) heating said compact mat to a temperature to soften said composition;
(d) then drawing said mat in a direction transverse to the lay of said filaments to form an elongate, expanded thickness pad;
(e) heating said pad in its expanded thickness form momentarily to a temperature below the curing temperature of said composition to soften said composition; and
(f) flattening said pad while said composition is in a soft state, and maintaining it in a flattened condition while said composition is cooling.

5. The method of claim 4 in which:
(a) said compact mat is heated to a temperature in the range of about 150°–190° F.; and
(b) said pad in its expanded thickness form is momentarily subjected to a substantially higher temperature to heat said composition to a temperature below the curing temperature to soften said composition before flattening said pad.

6. The method of claim 4 in which:
(a) incremental portions of said compact mat are progressively drawn out into an open space at ambient temperatures while maintaining the undrawn portions of said mat in a heated condition.

7. A method of making a filamentous mat, comprising:
(a) forming a compact mat of overlying layers of filaments, with at least some of the filaments of adjacent layers lying in generally crossing relation;
(b) applying a polyester resin-silane finish composition having a silane component of less than 1% to said filaments during formation of said mat;
(c) storing said compact mat in a heated area having a temperature below the curing temperature of said composition to soften said composition;
(d) then progressively withdrawing successive longitudinal edge portions of said compact mat from said heated area in a direction transverse to the lay of said filaments to form an elongate, expanded thickness pad which cools as it advances;
(e) momentarily heating successive increments of said pad in its expanded thickness form to a temperature below the curing temperature of said resin to again soften said composition; and
(f) then immediately flattening said pad and maintaining it in a flattened condition while said composition is cooling.

8. The method of claim 7 including:
(a) drawing air through said flattened pad to accelerate cooling of said pad.

9. In the method of processing a compact filamentous mat of the type formed on a rotating drum in a series of overlying layers with at least parts of the filaments of adjacent layers lying in generally crossing relation, the compact mat having a heat softenable binder dispersed throughout;
(a) heating said compact mat to only soften said binder;
(b) stretching said mat, in a direction transverse to the generaly lay of said filaments, to a degree to reorient said filaments relative to each other and thereby form an expanded thickness, narrowed, elongate pad;
(c) heating said pad to a temperature below the reaction temperature of said composition to again soften said binder; and
(d) flattening said pad while said binder is in said softened state, and maintaining said pad in said flattened condition while passing it through a cooling zone.

References Cited

UNITED STATES PATENTS

| | | | |
|---|---|---|---|
| 2,609,320 | 9/1952 | Modigliani | 156—174 |
| 2,953,187 | 9/1960 | Francis | 156—498 X |
| 3,081,195 | 3/1963 | Biefeld et al. | 117—126 |
| 3,092,533 | 6/1963 | Beckner | 156—174 X |

EARL M. BERGERT, *Primary Examiner.*

P. DIER, *Assistant Examiner.*